US007818379B1

(12) United States Patent
Heikes et al.

(10) Patent No.: US 7,818,379 B1
(45) Date of Patent: Oct. 19, 2010

(54) NOTIFICATION AND DISPOSITION OF MULTIPLE CONCURRENT INSTANT MESSAGING SESSIONS INVOLVING A SINGLE ONLINE IDENTITY

(75) Inventors: Brian Dean Heikes, Ashburn, VA (US); James A. Odell, Potomac Falls, VA (US); Andrew L. Wick, McLean, VA (US); Barry Appelman, McLean, VA (US)

(73) Assignee: AOL Inc., Dulles, VA (US)

( * ) Notice: Subject to any disclaimer, the term of this patent is extended or adjusted under 35 U.S.C. 154(b) by 1102 days.

(21) Appl. No.: 11/019,536

(22) Filed: Dec. 23, 2004

Related U.S. Application Data

(60) Provisional application No. 60/605,534, filed on Aug. 31, 2004.

(51) Int. Cl.
*G06F 15/16* (2006.01)
*G06F 15/177* (2006.01)

(52) U.S. Cl. .................. 709/206; 709/227; 709/228
(58) Field of Classification Search ................ 709/206, 709/227, 228
See application file for complete search history.

(56) References Cited

U.S. PATENT DOCUMENTS

| | | | |
|---|---|---|---|
| 5,793,365 A | 8/1998 | Tang et al. | |
| 5,872,521 A | 2/1999 | Lopatukin et al. | |
| 5,960,173 A | 9/1999 | Tang et al. | |
| 6,260,148 B1 | 7/2001 | Aggarwal et al. | |
| 6,301,609 B1 | 10/2001 | Aravamudan et al. | |
| 6,366,962 B1 | 4/2002 | Teibel | |
| 6,389,127 B1 | 5/2002 | Vardi et al. | |
| 6,405,035 B1 | 6/2002 | Singh | |
| 6,449,344 B1 | 9/2002 | Goldfinger et al. | |
| 6,505,167 B1 | 1/2003 | Horvitz et al. | |
| 6,519,639 B1 | 2/2003 | Glasser et al. | |
| 6,539,421 B1 | 3/2003 | Appelman et al. | |
| 6,549,937 B1 | 4/2003 | Auerbach et al. | |
| 6,564,261 B1 * | 5/2003 | Gudjonsson et al. | ........ 709/227 |
| 6,604,133 B2 | 8/2003 | Aggarwal et al. | |

(Continued)

OTHER PUBLICATIONS

"Mac OS X in the Open: View topic—Adium History," [online], [retrieved on Dec. 14, 2004]. Retrieved from the Internet http://forums.cocaforge.com/viewtopic.php?t=168&highlight=history, (2 pages).

(Continued)

*Primary Examiner*—William C Vaughn, Jr.
*Assistant Examiner*—Muktesh G Gupta
(74) *Attorney, Agent, or Firm*—Finnegan, Henderson, Farabow, Garrett & Dunner LLP

(57) ABSTRACT

Notifying a user of multiple concurrent instant messaging sessions includes receiving a first request to establish a first instant messaging session associated with an instant messaging online identity assigned to a user using a first instant messaging controller and establishing the first instant messaging session in response to the first request. A second request is received to establish a second instant messaging session associated with the instant messaging online identity assigned to the user using a second instant messaging controller that differs from the first instant messaging controller. The second instant messaging session is established in response to the second request. A notification is communicated to at least the first instant messaging controller indicating the establishment of the second instant messaging session.

33 Claims, 6 Drawing Sheets

U.S. PATENT DOCUMENTS

| | | | |
|---|---|---|---|
| 6,631,412 B1 | 10/2003 | Glasser et al. | |
| 6,654,790 B2 * | 11/2003 | Ogle et al. | 709/206 |
| 6,658,095 B1 | 12/2003 | Yoakum et al. | |
| 6,668,167 B2 | 12/2003 | McDowell et al. | |
| 6,677,968 B1 | 1/2004 | Appelman | |
| 6,691,162 B1 | 2/2004 | Wick | |
| 6,701,345 B1 | 3/2004 | Carley et al. | |
| 6,714,519 B2 * | 3/2004 | Luzzatti et al. | 370/252 |
| 6,714,793 B1 | 3/2004 | Carey et al. | |
| 6,728,357 B2 | 4/2004 | O'Neal et al. | |
| 6,750,881 B1 | 6/2004 | Appelman | |
| 6,760,580 B2 | 7/2004 | Robinson et al. | |
| 6,981,223 B2 * | 12/2005 | Becker et al. | 715/753 |
| 7,185,059 B2 * | 2/2007 | Daniell et al. | 709/206 |
| 7,185,290 B2 * | 2/2007 | Cadiz et al. | 715/838 |
| 7,275,215 B2 * | 9/2007 | Werndorfer et al. | 715/752 |
| 7,281,215 B1 * | 10/2007 | Canfield et al. | 715/752 |
| 7,356,567 B2 * | 4/2008 | Odell et al. | 709/206 |
| 7,360,164 B2 * | 4/2008 | Bjoernsen et al. | 715/751 |
| 7,543,034 B2 * | 6/2009 | Deshpande | 709/207 |
| 2001/0013050 A1 | 8/2001 | Shah | |
| 2001/0034224 A1 | 10/2001 | McDowell et al. | |
| 2001/0034622 A1 | 10/2001 | Davis | |
| 2002/0007398 A1 | 1/2002 | Mendiola et al. | |
| 2002/0026483 A1 | 2/2002 | Isaacs et al. | |
| 2002/0026520 A1 | 2/2002 | Mendiola et al. | |
| 2002/0034281 A1 * | 3/2002 | Isaacs et al. | 379/88.12 |
| 2002/0035605 A1 | 3/2002 | McDowell et al. | |
| 2002/0046299 A1 * | 4/2002 | Lefeber et al. | 709/318 |
| 2002/0062345 A1 | 5/2002 | Guedalia et al. | |
| 2002/0065894 A1 | 5/2002 | Dalal et al. | |
| 2002/0087704 A1 * | 7/2002 | Chesnais et al. | 709/228 |
| 2002/0116461 A1 | 8/2002 | Diacakis et al. | |
| 2002/0120687 A1 | 8/2002 | Diacakis et al. | |
| 2002/0120697 A1 | 8/2002 | Generous et al. | |
| 2002/0178161 A1 | 11/2002 | Brezin et al. | |
| 2003/0037103 A1 | 2/2003 | Salmi et al. | |
| 2003/0101343 A1 * | 5/2003 | Eaton et al. | 713/170 |
| 2003/0158864 A1 | 8/2003 | Samn | |
| 2003/0162561 A1 | 8/2003 | Johnson et al. | |
| 2003/0167172 A1 | 9/2003 | Johnson et al. | |
| 2003/0208545 A1 | 11/2003 | Eaton et al. | |
| 2003/0217109 A1 | 11/2003 | Ordille et al. | |
| 2004/0054737 A1 | 3/2004 | Daniell | |
| 2004/0059781 A1 | 3/2004 | Yoakum et al. | |
| 2004/0068567 A1 * | 4/2004 | Moran et al. | 709/227 |
| 2004/0073643 A1 | 4/2004 | Hayes et al. | |
| 2004/0078444 A1 * | 4/2004 | Malik | 709/206 |
| 2004/0111479 A1 | 6/2004 | Borden et al. | |
| 2004/0158610 A1 * | 8/2004 | Davis et al. | 709/206 |
| 2005/0094621 A1 * | 5/2005 | Acharya et al. | 370/352 |
| 2005/0233755 A1 * | 10/2005 | Jacovi et al. | 455/456.2 |

OTHER PUBLICATIONS

"Adium X: Version History," [online], [retrieved on Dec. 14, 2004]. Retrieved from the Internet http://www.adiumx.com/history.html, (12 pages).

"Gaim: The Pimpin' Penguin IM Client that's good for the soul!" [online], [retrieved on Dec. 14, 2004]. Retrieved from the Internet http://gaim.sourceforge.net/ChangeLog, (27 pages).

* cited by examiner

300

| Online Identity | Device | IP Address | Idle Time | Online Time |
|---|---|---|---|---|
| User1 | | | | |
| | PC-Home | 192.00.001 | 0 min | 1 day 1 hr 20 min |
| | Laptop | 192.00.002 | 20 min | 3 hr 01 min |
| | Cell Phone | 193.00.003 | 20 min | 2 hr 27 min |
| User2 | | | | |
| | PC-Home | 228.00.001 | 55 min | 2 day 2 hr 37 min |
| | PDA | 228.00.001 | 0min | 1 hr 03 min |

Columns: 305, 310, 320, 325, 330

Fig. 3

NOTIFICATION AND DISPOSITION OF MULTIPLE CONCURRENT INSTANT MESSAGING SESSIONS INVOLVING A SINGLE ONLINE IDENTITY

CROSS REFERENCE TO RELATED APPLICATIONS

This application claims the benefit of U.S. Provisional Application No. 60/605,534, filed Aug. 31, 2004, and titled "Notification of Multiple Concurrent Instant Messaging Sessions Involving a Single Online Identity," which is incorporated by reference.

TECHNICAL FIELD

This document relates to techniques for notifying a user of multiple concurrent instant messaging sessions involving a single online identity.

BACKGROUND

Instant messaging is one manner in which people may communicate with other people. A user may be able access an instant messaging online identity multiple times from multiple different devices. For example, the user may log into the user's instant messaging online identity through an instant messaging application on the user's desktop personal computer at home. At the same time, the user may log into the same instant messaging online identity through an instant messaging application on the user's personal digital assistant. An instant message notification scheme is desirable to address those situations when the user is logged into the same instant messaging online identity multiple times, potentially from multiple different devices.

DESCRIPTION OF DRAWINGS

FIG. 3 is an exemplary table tracking multiple concurrent instant messaging sessions per device.

Like reference symbols in the various drawings may indicate like elements.

DETAILED DESCRIPTION

Figure 1:
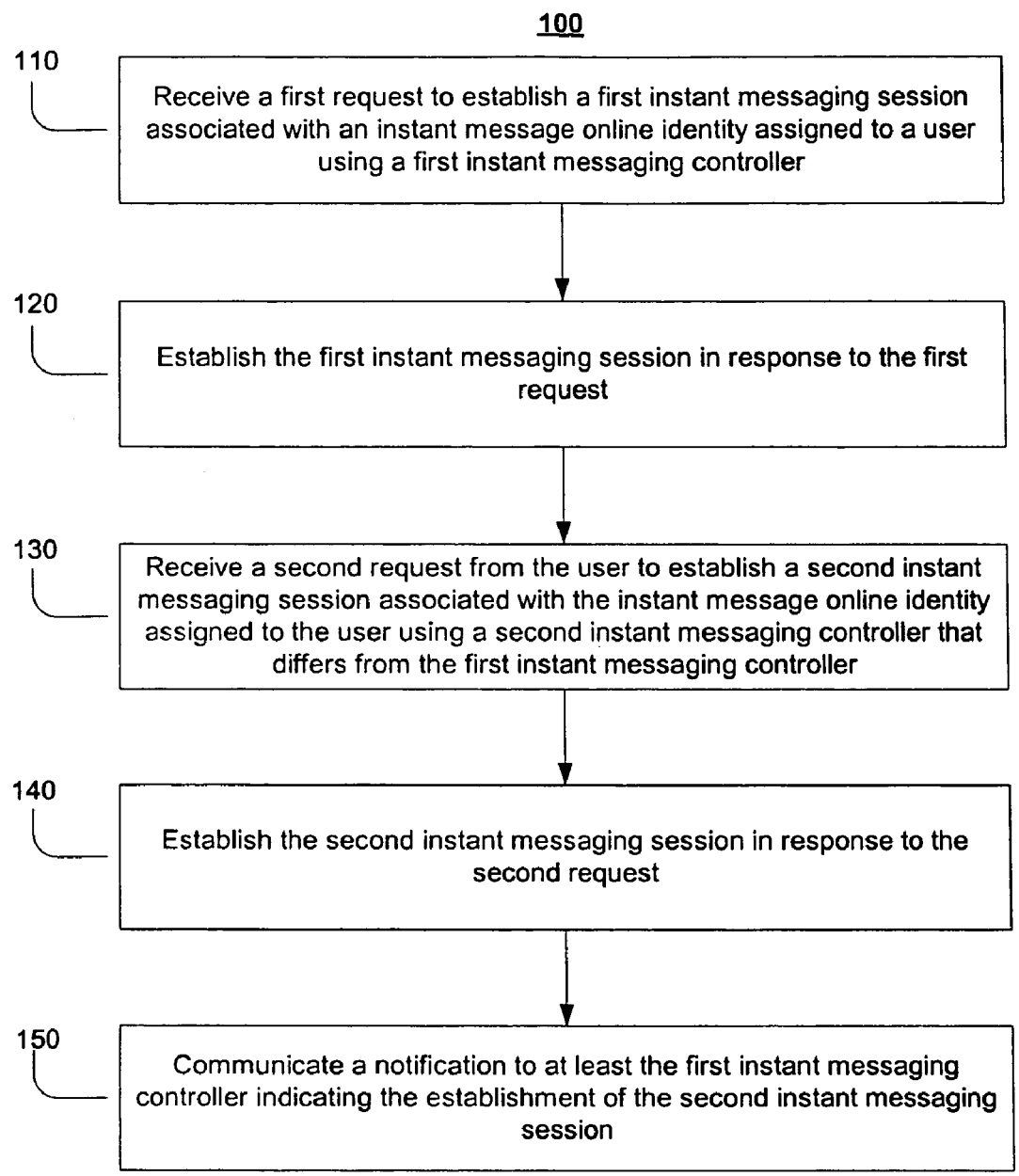
FIG. 1 is a flow chart of an exemplary process for notifying a user of multiple concurrent instant messaging sessions involving a single online identity.

In general, a user may have multiple, simultaneous instant messaging sessions that are associated with a user's single instant messaging account or identity. The user may conduct the multiple, concurrent instant messaging sessions using multiple instant messaging controllers (e.g., software applications). For example, a user may establish an instant messaging session associated with the user's instant messaging online identity using an instant messaging controller on a personal computer. Concurrently, the user may establish another instant messaging session associated with the user's instant messaging online identity using an instant messaging controller on a mobile device. Thus, the user may log in using the same instant messaging online identity multiple times to establish multiple instant messaging sessions using different instant messaging controllers on different devices. With the establishment of each instant messaging session, the user's Buddy List or a portion of the user's Buddy List (e.g., a Buddy group) may be accessed and presented to the user, such that the user receives an indication of which buddies are online. The user may communicate using instant messages with the buddies from each of the different devices.

The user may log in using the same instant messaging online identity multiple times to establish multiple instant messaging sessions using different instant messaging controllers on different devices for different reasons. For example, the user may log in on both a mobile device and a desktop computing device so that the user may continue to communicate using instant messages on the mobile device when the user walks away from the desktop computing device.

In this example, with the establishment of each instant messaging session, a notification is sent to the user. The notification may be sent to and displayed on one or more of the devices where the user has established an instant messaging session. For example, the notification may be sent and displayed on the device where the user established the first instant messaging session. Additionally or alternatively, the notification may be sent and displayed on select devices or all of the devices where the user has established instant messaging sessions. In another exemplary implementation, the notification may be sent to fewer than all of the devices where the user has established an instant messaging session using criteria such as, for example, the state of the instant messaging session, to determine which devices to send the notification. By informing the user of the existence of multiple concurrent instant messaging sessions, the user is aided in guarding against a person establishing an instant messaging session using the user's online identity without the user's knowledge.

In one exemplary implementation, a notification may be sent to the user upon the occurrence of certain events in an instant messaging session. For instance, a periodic notification may be sent to the user that indicates the number and/or locations of the instant messaging sessions that are established for the user. Also, a notification may be sent when an instant messaging session is terminated or upon the occurrence of other triggers.

The notification may be in one or more forms. For example, the notification may be in the form of an instant message. Additionally or alternatively, the notification may be in the form of an alert (e.g., a pop-up window, a flashing icon, a notification within the buddy list interface, or a scrolling alert) or other visible and/or audible or otherwise perceivable indication including any perceivable state change in any user interface visible to the user.

FIG. 1 illustrates an exemplary process 100 for notifying a user when there are multiple, concurrent instant messaging sessions using the same instant messaging online identity. A first request is received to establish a first instant messaging session associated with an instant message online identity assigned to a user using a first instant messaging controller (step 110). In response to the first request, the first instant messaging session is established (step 120). A second request is received from the user to establish a second instant messaging session associated with the instant messaging online identity assigned to the user using a second instant messaging controller that differs from the first instant messaging controller (step 130). In response to the second request, the second instant messaging session is established (step 140). A notification is communicated to at least the first instant messaging controller indicating the establishment of the second instant messaging session (step 150). In one exemplary implementation, the notification may be communicated only to previously logged in instant messaging controllers. In another exemplary implementation, the notification may be communicated to all of the instant messaging controllers. The notification settings and preferences may be configured by the user.

The user may request to establish an instant messaging session associated with an instant messaging online identity using an instant messaging controller (steps 110 and 130). References to the user request to establish an instant messaging session include user initiated actions on a device having an instant messaging controller and any automated request that an instant messaging controller on a device may initiate to establish an instant messaging session. Thus, the request to establish an instant messaging session does not necessarily require a manually triggered request from the user but instead may be, for example, the automatic launch of an instant messaging controller as part of the start-up sequence for a device or upon the detection of a connection to a communications network, such as the Internet.

Typically, a user is associated with an instant messaging online identity. The instant messaging online identity may be maintained at a remote location by an instant messaging service provider. In one implementation, a user may subscribe to an instant messaging online identity with a commercial instant messaging service provider, such as those provided by America Online, Inc., Yahoo, Inc., Microsoft, Inc., and other instant messaging service providers. In another implementation, a user may be a part of an enterprise instant messaging service and may have an instant messaging online identity as part of the enterprise system, such as a corporate instant messaging service. In some cases, the instant messaging online identity may be part of both a commercially available instant message service provider and an enterprise instant message provider. In yet another implementation, the user may have an instant messaging online identity in a point-to-point ("P2P") instant messaging system.

The instant messaging online identity may be accessed by the user through the use of the online identity and a password. For example, the online identity may include a set of alpha-numeric characters, symbols, tokens, or other types of online identities. In one implementation, a screen name may be used as the online identity. The instant messaging online identity typically includes information related to the user such as a user's profile. The user's profile may include the user's preferences and a user-defined list of other co-users or co-subscribers, which may be called a user's buddy list.

In general, a user's buddy list may be maintained with or accessible as part of a user's profile and may be made accessible using a user interface (UI) that provides the online status and capabilities of certain screen names, i.e., "buddies," identified by the user. In particular, the instant message service provider may inform the user whether or not identified buddies are online, i.e., currently accessing the instant messaging service provider, enterprise host, or PTP node, as the case may be. The instant message service provider also informs any other user who has identified the user as a buddy that the user is currently online.

An instant messaging session includes a time from when a user requests and establishes the instant messaging session until the user logs off or is otherwise disconnected from the instant messaging session. A single instant messaging session may include one or more separate instant message exchanges with one or more buddies. An instant message may include a text or non-text (e.g., audio, video) instant message.

In one implementation, one aspect of establishing the instant messaging session (steps 120 and 140) includes notifying the user of his buddies that are online and notifying other users, who list the user as a buddy, that the user is online. When the first instant messaging session is established (step 120), the other users may be notified that the user is online. When the second instant messaging session is established (step 140), the other users may not be re-notified that the user is online because the second instant messaging session is associated with the same instant messaging online identity as the first instant messaging session.

An instant messaging session may be established using an instant messaging controller and a device. An example of a device is a general-purpose computer capable of responding to and executing instructions in a defined manner. Other examples include a special-purpose computer, a personal computer ("PC"), a workstation, a server, a laptop, a cellular communications device, a Web-enabled telephone, a personal digital assistant ("PDA"), a Web-enabled PDA, an interactive television set, a settop box, a video tape recorder ("VTR"), a DVD player, an on-board (i.e., vehicle-mounted) computer, or any other component, machine, tool, equipment, or some combination thereof capable of responding to and executing instructions.

An example of a controller, including an instant messaging controller, is a software application (e.g., operating system, browser application, microbrowser application, server application, proxy application, gateway application, tunneling application, e-mail application, instant messaging client, online service provider client application, interactive television client application, and/or Internet service provider client) loaded on a device to command and direct communications enabled by the device. Other examples include a computer program, a piece of code, an applet, a Java applet, a script, an instruction, another device, or some combination thereof, for independently or collectively instructing the device to interact and operate as desired. The controller may be embodied permanently or temporarily in any type of machine, component, physical or virtual equipment, storage medium, or propagated signal capable of providing instructions to a device. In particular, the controller (e.g., software application, computer program) may be stored on a storage media or device (e.g., ROM, magnetic diskette, or propagated signal) readable by a general or special purpose programmable computer, such that if the storage media or device is read by a computer system, the functions described herein are performed.

A buddy list may be used to facilitate instant messaging communications between users. For example, a user can activate an instant messaging user interface that is pre-addressed to a buddy simply by selecting the screen name of an online buddy from the buddy list.

Alternatively, by way of example, if a recipient is not a "buddy," the first user generally initiates instant messaging communications by activating a blank instant messaging user interface and then addressing that interface to the online identity (e.g., screen name) of the intended recipient. When necessary, a user may look up the screen name of an intended recipient using the intended recipient's e-mail address or other means.

In response to receiving a request from the user to establish an instant messaging session (steps 110 and 130), the instant messaging session is established (steps 120 and 140). After the user establishes an instant messaging session (steps 120 and 140), a notification is communicated to at least the first instant messaging controller indicating the establishment of the second instant messaging session (step 150). The notification may be made visually and/or audibly perceptible to the user on the device that is running the instant messaging controller.

Figure 2A:
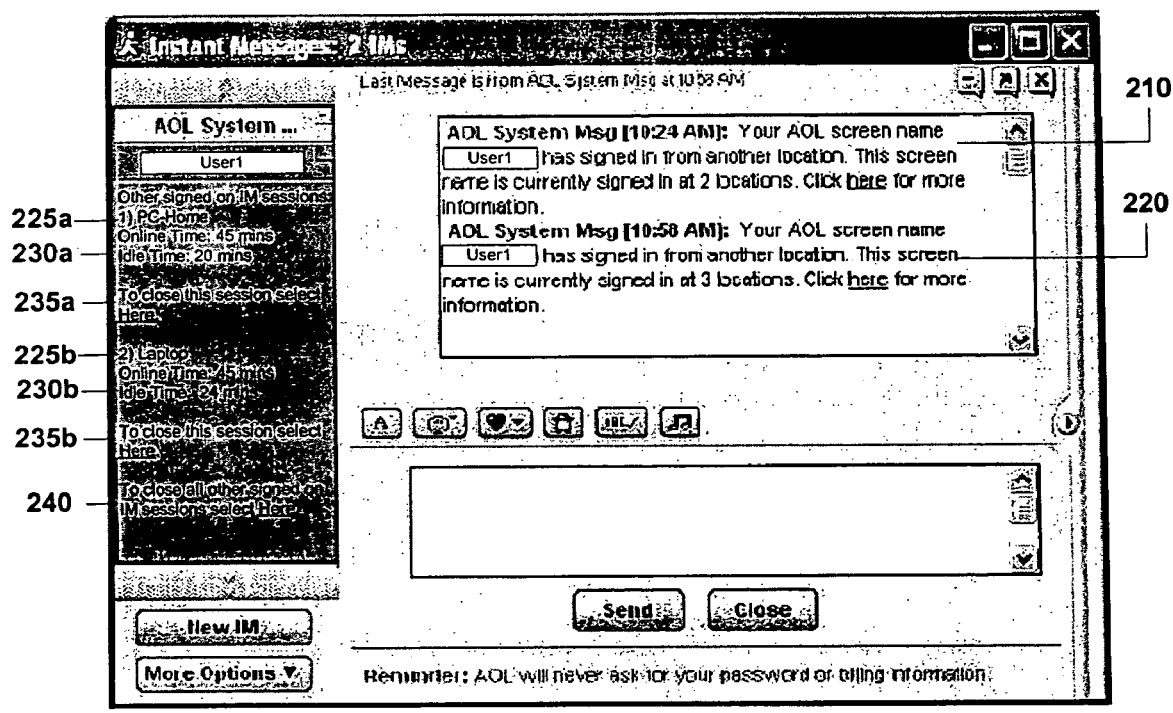
FIGS. 2A and 2B are exemplary screens shot of a visual notification communicated to an instant messaging controller.

Referring to FIG. 2A, an exemplary screenshot 200 is provided to illustrate the notification communicated to and made visually perceptible to the user. In this instance, the user first establishes an instant messaging session using an online identity "User1" from a first instant messaging controller. When the same online identity "User1" establishes a second instant messaging session from a second instant messaging controller, a notification in the form of an instant message 210, time stamped at 10:24 am, is sent to the online identity "User1" notifying the user that the online identity has signed in from another location. The message also notifies the user that the online identity is currently signed on at two locations.

When the same online identity "User1" establishes a third instant messaging session from a third instant messaging controller, a second notification in the form of an instant message 220, time stamped at 10:58 am, is sent to the online identity "User1" notifying the user that the online identity has signed in from a third location. This example is shown in the tabbed IM form.

In one exemplary implementation, the notification may include more specific information regarding the other instant messaging sessions. For instance, the notification may include the location and/or device 225a and 225b on which the instant messaging session is established. Other metadata-type information such as the online time and idle time 230a and 230b of the other instant messaging sessions also may be made perceivable or selectable for perception by a user, as may be the content or history displayed on the screen of the other instant messaging session. The user also may be given an option to close a specific instant messaging session 235a and 235b and/or may be given an option to close all of the other instant messaging sessions 240.

In one implementation, instant messaging sessions are established by an instant messaging provider using, for example, an instant messaging server. The instant message server may include a collection of one or more related servers that perform one or more instant messaging functions, including receiving requests to establish instant messaging session, establishing the instant messaging sessions, tracking users who have established one or more instant messaging sessions with their instant messaging online identity, and communicating notification to one or more of the instant messaging controllers indicating the establishment of instant messaging sessions subsequent to the first instant messaging session.

When one of these options 235a, 235b, or 240 are selected, a communication may be sent to the instant messaging server to close one or all of the other instant messaging sessions. The instant messaging server may close the selected instant messaging sessions and a notification may be sent to the instant messaging controller that indicates the selected instant messaging sessions was closed.

Figure 2B:
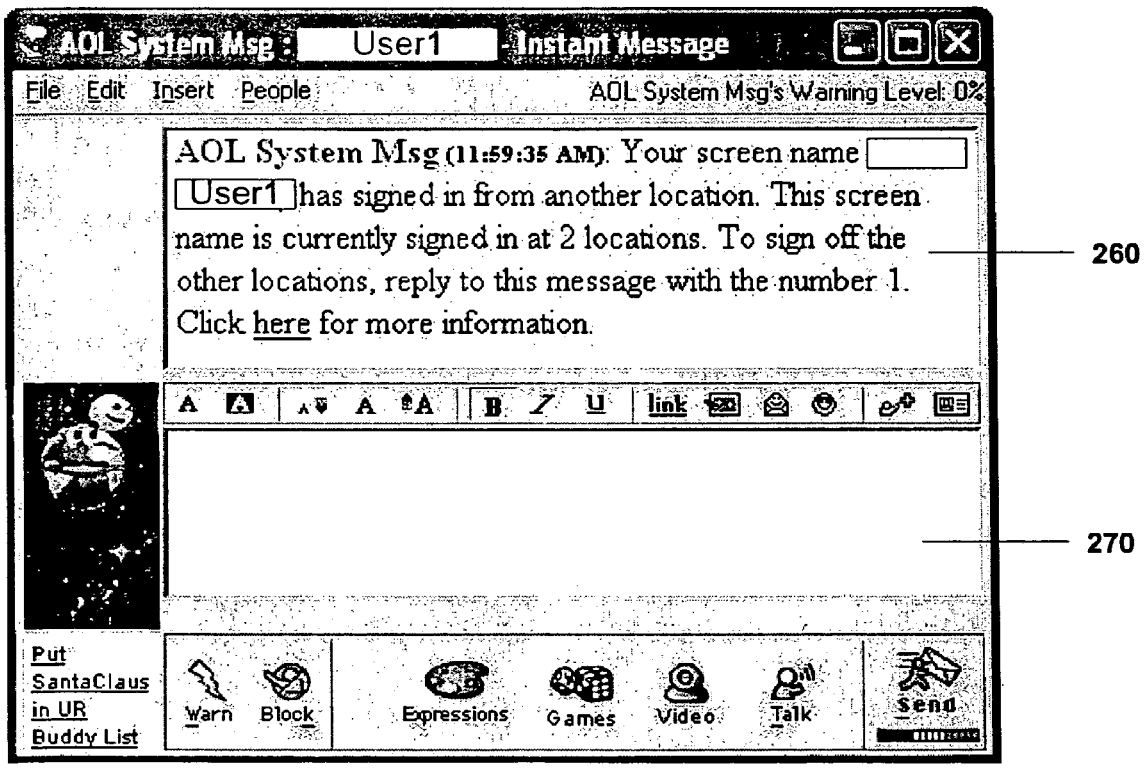

Referring to FIG. 2B, an exemplary screenshot 250 is provided to illustrate the notification communicated to and made visually perceptible to the user. Screenshot 250 includes a notification in the form of an instant message 260 that notifies the user that their online identity (i.e., screen name) is currently signed on at 2 locations. The notification 260 also informs the user that to sign off of the other location, the user can reply to the notification with the number 1. Thus, if the user wants to sign off of the instant messaging controller at the other device, the user can reply to the instant message by typing "1" in the text box 270 and sending the instant message. Upon receipt of the instant message, the instant messaging provider, for example at the instant messaging server, signs the user off of the other instant messaging controller at the other device.

Referring to FIG. 3, an exemplary table 300 illustrates a relationship that may be maintained to track the established, multiple concurrent instant messaging sessions for an online identity on a per device basis and/or address basis. Table 300 may be tracked by the intermediary, such as, for example, the instant messaging server described above for each online identity 305. An online identity's 305 established instant messaging sessions may be tracked by device 310 and/or by an address of the device, such as, the Internet Protocol (IP) address the device used to establish the instant messaging session 320. In exemplary table 300, the online identity "User1" has established three instant messaging sessions: an instant messaging session on the online identity's home personal computer, designated in the table as "PC-Home"; an instant messaging session on the online identity's laptop computer, designated in the table as "Laptop"; and an instant messaging session on the online identity's cellular phone, designated in the table as "Cellular Phone." The online identity "User2" has two established instant messaging sessions: an instant messaging session on the online identity's home personal computer, designated in the table as "PC-Home" and an instant messaging session on the online identity's personal digital assistant (PDA), designated in the table as "PDA." In one exemplary implementation, a token or other identifier that is associated with a particular device or a particular instant messaging controller on a specific device may be used to identify the device from which the instant messaging session is established. The token or other identifier may be associated with the device or instant messaging controller on the device during the installation process. For example, the user may be asked to identify the device and name the device during the installation process. Alternatively, the instant messaging controller may automatically determine the type of device that that controller is being installed on and/or is operating on.

When the instant messaging session is being established, the token or other identifier is communicated to the instant messaging server along with the IP address and the online identity and that information is used to populate table 300. Each time that the online identity establishes an instant messaging session the table 300 may be checked to determine whether the online identity already has an established instant messaging session. If an instant messaging session is already established and it is from a different device and/or IP address, then a notification may be sent to at least the instant messaging controller from which the first instant messaging session was established.

The information contained in Table 300 may be considered metadata, which may be made perceivable to the user in the notification that is sent to the instant messaging controller. Other information that may be tracked for each online identity may include idle time 325 and online time 330. This other information also may be made perceivable to the user in the notification that is sent to the instant messaging controller.

Figure 4:
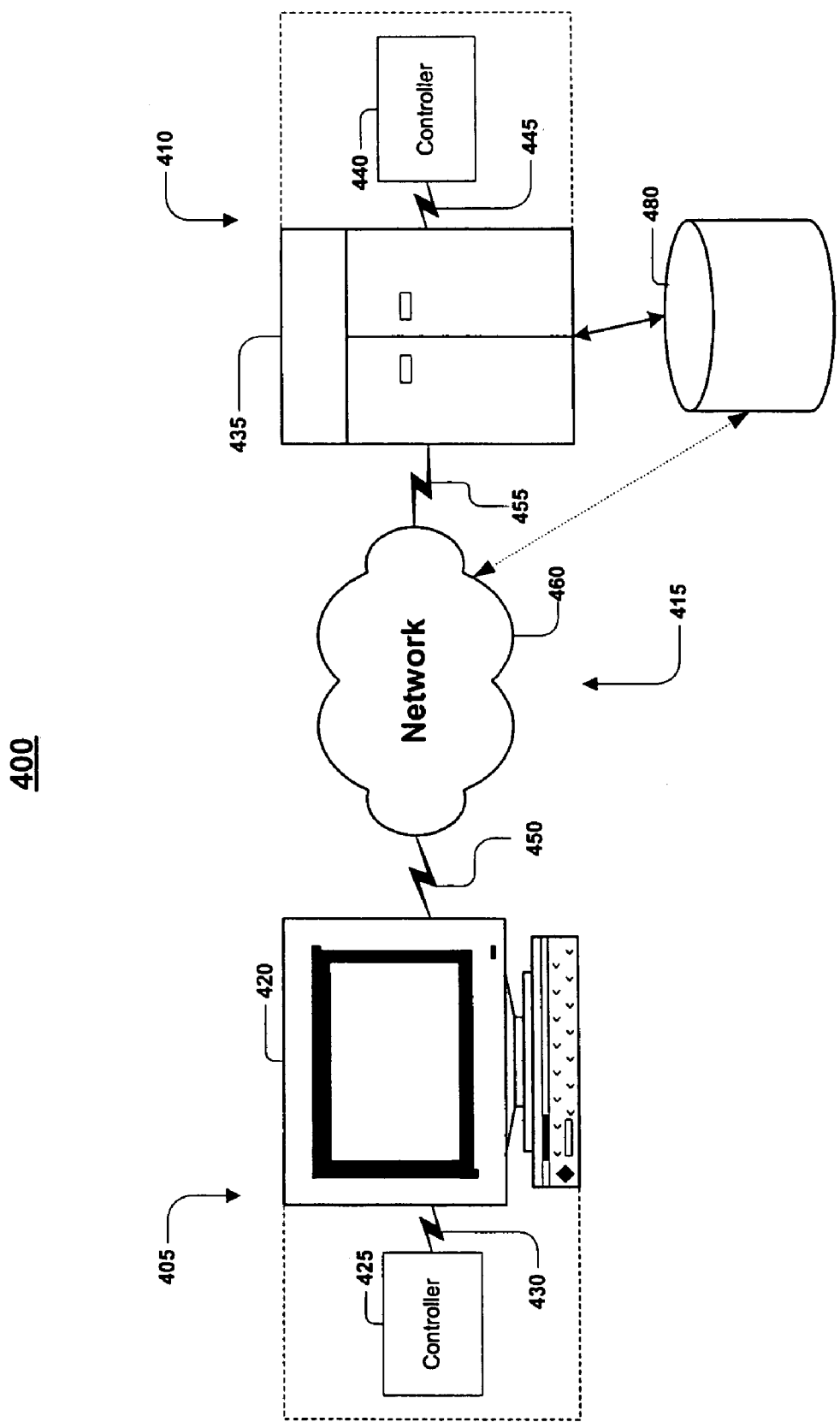
FIG. 4 is a block diagram of a communications system.
Figure 5:
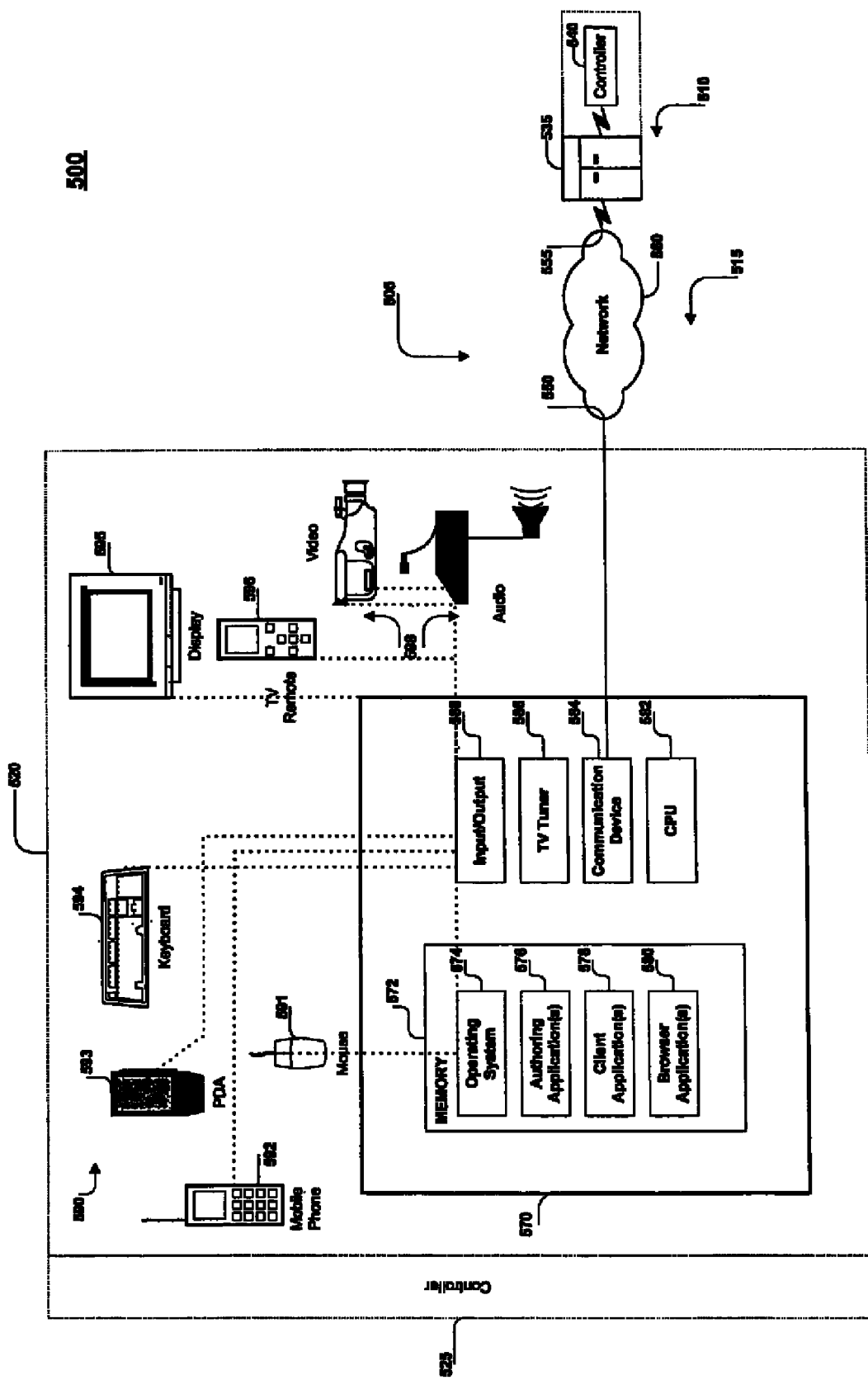
FIG. 5 is an expansion of the block diagram of FIG. 4.

FIGS. 4 and 5 illustrate an exemplary block diagram 400 and 500 of a communications system that may be used as part of the implementation of the features described above.

For illustrative purposes, FIGS. 4 and 5 show an example of a communications system for implementing techniques for transferring electronic data, including instant messages. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 4, a communications system 400 is capable of delivering and exchanging data between a user system 405 and a provider system 410 through a communications link 415. The user system 405 may include a client system and the provider system 410 may include a host system. The user system 405 typically includes one or more user devices 420 and/or user controllers 425, and the provider system 410 typically includes one or more provider devices 435 and/or provider controllers 440. For example, the user system 405 or the provider system 410 may include one or more general-purpose computers (e.g., personal computers), one or more special-purpose computers (e.g., devices specifically programmed to communicate with each other and/or the user system 405 or the provider system 410), or a combination of one or more general-purpose computers and one or more special-purpose computers. The user system 405 and the provider system 410 may be arranged to operate within or in concert with one or more other systems, such as, for example, one or more Local Area Networks ("LANs") and/or one or more Wide Area Networks ("WANs").

The provider system 410 may include a communication interface such as an electronic mail gateway. For instance, the provider system 410 may include a dedicated mailing system that is implemented by specialized hardware or executed by a general purpose processor capable of running various applications, such as electronic mailer programs, and capable of employing various file transfer protocols, such as the Simple Mail Transfer Protocol ("SMTP"). The communications interface of provider system 410 enables communications between the provider system 410 and other systems through, for example, communications link 415.

The user device 420 (or the provider device 435) is generally capable of executing instructions under the command of a user controller 425 (or a provider controller 440). The user device 420 (or the provider device 435) is connected to the user controller 425 (or the provider controller 440) by a wired or wireless data pathway 430 or 445 capable of delivering data.

The user device 420, the user controller 425, the provider device 435, and the provider controller 440 each typically include one or more hardware components and/or software components. An example of a user device 420 or a provider device 435 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The user device 420 and the provider device 435 may include devices that are capable of peer-to-peer communications.

An example of a user controller 425 or a provider controller 440 is a software application loaded on the user device 420 or the provider device 435 for commanding and directing communications enabled by the user device 420 or the provider device 435. Other examples include a program, a piece of code, an instruction, a device, a computer, a computer system, or a combination thereof, for independently or collectively instructing the user device 420 or the provider device 435 to interact and operate as described. The user controller 425 and the provider controller 440 may be embodied permanently or temporarily in any type of machine, component, physical or virtual equipment, storage medium, or propagated signal capable of providing instructions to the user device 420 or the provider device 435.

The communications link 415 typically includes a delivery network 460 making a direct or indirect communication between the user system 405 and the provider system 410, irrespective of physical separation. Examples of a delivery network 460 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 415 may include communication pathways 450 and 455 that enable communications through the one or more delivery networks 460 described above. Each of the communication pathways 450 and 455 may include, for example, a wired, wireless, cable or satellite communication pathway.

An electronic information store 480 may be connected to the provider system 410, included as a component of the provider system 410, and/or connected to the delivery network 460. The electronic information store 480 may be a repository for electronic information that may be in an indexed and/or searchable format. For example, in one implementation, the electronic information store 480 may be used to store information related to instant messaging online identities.

FIG. 5 illustrates a communications system 500 including a user system 505 communicating with a provider system 510 through a communications link 515. User system 505 typically includes one or more user devices 520 and one or more user controllers 525 for controlling the user devices 520. Provider system 510 typically includes one or more provider devices 535 and one or more provider controllers 540 for controlling the provider devices 535. The communications link 515 may include communication pathways 550 and 555 that enable communications through the one or more delivery networks 560.

Examples of each element within the communications system of FIG. 5 are broadly described above with respect to FIG. 4. In particular, the provider system 510 and communications link 515 typically have attributes comparable to those described with respect to the provider system 410 and the communications link 415 of FIG. 4. Likewise, the user system 505 of FIG. 5 typically has attributes comparable to and illustrates one possible implementation of the user system 405 of FIG. 4.

The user device 520 typically includes a general-purpose computer 570 having an internal or external storage 572 for storing data and programs such as an operating system 574 (e.g., DOS, Windows™, Windows 95™, Windows 98™, Windows 2000™, Windows Me™, Windows XP™, Windows NTT™, OS/2, or Linux) and one or more application programs. Examples of application programs include authoring applications 576 (e.g., word processing programs, database programs, spreadsheet programs, or graphics programs) capable of generating documents or other electronic content; client applications 578 (e.g., stand alone e-mail client or AOL client, CompuServe client, AIM client, AOL TV client, or ISP client, all of which may include a built-in or embedded e-mail or instant messaging client) capable of communicating with other computer users, accessing various computer resources, and viewing, creating, or otherwise manipulating electronic content; and browser applications 580 (e.g., Netscape's Navigator or Microsoft's Internet Explorer) capable of rendering standard Internet content and also capable of supporting a web-based e-mail client and a web-based instant messaging client.

The general-purpose computer 570 also includes a central processing unit 582 (CPU) for executing instructions in response to commands from the user controller 525. In one implementation, the user controller 525 includes one or more of the application programs installed on the internal or external storage 572 of the general-purpose computer 570. In another implementation, the user controller 525 includes application programs stored in and performed by one or more device(s) external to the general-purpose computer 570.

The general-purpose computer also includes a communication device 584 for sending and receiving data. One example of the communication device 584 is a modem. Other examples include a transceiver, a set-top box, a communication card, a satellite dish, an antenna, or another network adapter capable of transmitting and receiving data over the communications link 515 through a wired or wireless data pathway 550. The general-purpose computer 570 also may include a TV tuner 586 for receiving television programming in the form of broadcast, satellite, and/or cable TV signals. As a result, the user device 520 can selectively and/or simultaneously display network content received by communications device 584 and television programming content received by the TV tuner 586.

The general-purpose computer 570 typically includes an input/output interface 588 for wired or wireless connection to various peripheral devices 590. Examples of peripheral devices 590 include, but are not limited to, a mouse 591, a mobile phone 592, a personal digital assistant 593 (PDA), a MP3 player (not shown), a keyboard 594, a display monitor 595 with or without a touch screen input, a TV remote control 596 for receiving information from and rendering information to subscribers, and an audiovisual input device 598.

Although FIG. 5 illustrates devices such as a mobile telephone 592, a PDA 593, and a TV remote control 596 as being peripheral with respect to the general-purpose computer 570, in another implementation, such devices may themselves include the functionality of the general-purpose computer 570 and operate as the user device 520. For example, the mobile phone 592 or the PDA 593 may include computing and networking capabilities and function as a user device 520 by accessing the delivery network 560 and communicating with the provider system 510. Furthermore, the user system 505 may include one, some or all of the components and devices described above.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method for notifying a user that an instant messaging online identity assigned to the user is logged on to an instant messaging system from different devices concurrently, the method comprising:
    receiving, from a first instant messaging controller on a first device, a first request for an instant messaging online identity assigned to a user to be logged on to an instant messaging system at a first instant messaging controller on a first device;
    logging the instant messaging online identity on to the instant messaging system at the first instant messaging controller on the first device in response to the first request;
    while the instant messaging online identity remains logged on to the instant messaging system from the first instant messaging controller on the first device:
        receiving, from a second instant messaging controller on a second device, a second request for the same instant messaging online identity assigned to the same user to be logged on to the instant messaging system at a second instant messaging controller on a second device, wherein the second instant messaging controller differs from the first instant messaging controller and the second device differs from the first device;
        logging the instant messaging online identity on to the instant messaging system at the second instant messaging controller on the second device in response to the second request;
    determining that the same instant messaging online identity is logged on to the instant messaging system from the first instant messaging controller on the first device while concurrently being logged on to the instant messaging system from the second instant messaging controller on the second device; and
    communicating a notification to at least one of the first instant messaging controller on the first device and the second instant messaging controller on the second device indicating that the instant messaging online identity is logged on to the instant messaging system from the second instant messaging controller on the second device while concurrently being logged on to the instant messaging system from the first instant messaging controller on the first device in response to determining that the instant messaging online identity is logged on to the instant messaging system from the first instant messaging controller on the first device while concurrently being logged on to the instant messaging system from the second instant messaging controller on the second device.

2. The method as in claim 1 wherein communicating the notification includes communicating the notification to the first instant messaging controller on the first device and the second instant messaging controller on the second device.

3. The method as in claim 1 wherein the notification includes a visual indication that indicates that the instant messaging online identity is logged on to the instant messaging system from the second instant messaging controller on the second device while concurrently being logged on to the instant messaging system from the first instant messaging controller on the first device, and further comprising:

making the visual indication perceivable on at least a display associated with the first device.

4. The method as in claim 3 wherein the visual indication includes an instant message.

5. The method as in claim 3 wherein the visual indication includes a pop-up window.

6. The method as in claim 3 wherein the visual indication includes an alert.

7. The method as in claim 1 wherein the notification includes an audible indication that indicates that the instant messaging online identity is logged on to the instant messaging system from the second instant messaging controller on the second device while concurrently being logged on to the instant messaging system from the first instant messaging controller on the first device, and further comprising:

making the audible indication perceivable on at least a sound device associated with the first device.

8. The method as in claim 1 wherein the notification includes an indication of a number of devices from which the instant messaging online identity is logged on to the instant messaging system.

9. The method as in claim 1 further comprising enabling the instant messaging online identity to force the instant messaging online identity to be logged off of the instant messaging system from the second instant messaging controller on the second device by responding to the notification from the first device.

10. The method as in claim 1 wherein communicating the notification includes communicating the notification to the first instant messaging controller on the first device indicating metadata information about a status of the second instant messaging controller on the second device.

11. The method as in claim 10 wherein the metadata information includes an online time.

12. The method as in claim 10 wherein the metadata information includes an idle time.

13. The method as in claim 1 further comprising:

logging the instant messaging online identity off from the instant messaging system at the second instant messaging controller on the second device using the second instant messaging controller on the second device; and in response to the termination of the second instant messaging session, communicating a notification to the first instant messaging controller on the first device indicating that the instant messaging online identity has logged off of the instant messaging system from the instant messaging controller on the second device.

14. The method as in claim 1 further comprising communicating periodically a subsequent notification to at least the first instant messaging controller on the first device indicating a number of devices from which the instant messaging online identity is signed on to the instant messaging system.

15. The method as in claim 1 further comprising:

while the instant messaging online identity remains logged on to the instant messaging system from both the first instant messaging controller on the first device and the second instant messaging controller on the second device:

receiving, from a third instant messaging controller on a third device, a subsequent request for the instant messaging online identity assigned to the user to be logged on to the instant messaging system at the third instant messaging controller on the third device, wherein the third instant messaging controller differs from the first instant messaging controller and the second instant messaging controller and the third device differs from the first device and the second device;

logging the instant messaging online identity on to the instant messaging system at the third instant messaging controller on the third device in response to the subsequent request;

determining that the same instant messaging online identity is logged on to the instant messaging system from the first instant messaging controller on the first device while concurrently being logged on to the instant messaging system from both the second instant messaging controller on the second device and the third instant messaging controller on the third device; and communicating a subsequent notification to at least the first instant messaging controller on the first device indicating that the instant messaging online identity is logged on to the instant messaging system from the second instant messaging controller on the second device and the third instant messaging controller on the second device while concurrently being logged on to the instant messaging system from the first instant messaging controller on the first device in response to determining that the instant messaging online identity is logged on to the instant messaging system from the first instant messaging controller on the first device while concurrently being logged on to the instant messaging system from both the second instant messaging controller on the second device and the third instant messaging controller on the third device.

16. The method as in claim 15 further comprising enabling the instant messaging online identity to separately force the instant messaging online identity to be logged off of the instant messaging system from the second instant messaging controller on the second device and from the third instant messaging controller on the third device by responding to the notification from the first device.

17. The method as in claim 15 further comprising enabling the instant messaging online identity to force the instant messaging online identity to be logged off of the instant messaging system from the second instant messaging controller on the second device and from the third instant messaging controller on the third device by sending a single response to the notification from the first device.

18. The method as in claim 15 wherein communicating the subsequent notification includes communicating the subsequent notification to the first instant messaging controller on the first device and the second instant messaging controller on the second device indicating that the instant messaging online identity is logged on to the instant messaging system from the second instant messaging controller on the second device and the third instant messaging controller on the second device while concurrently being logged on to the instant messaging system from the first instant messaging controller on the first device.

19. The method as in claim 1 wherein:
the first device is a personal computer and the first instant messaging controller is a computer program running on the personal computer; and
the second device is a mobile device and the second instant messaging controller is a computer program running on the mobile device.

20. The method as in claim 19 wherein the mobile device includes a cellular phone.

21. The method as in claim 19 wherein the mobile device includes a personal digital assistant.

22. The method as in claim 1 wherein:
the first device is a mobile device and the first instant messaging controller is a computer program running on the mobile device; and
the second device is a different mobile device and the second instant messaging controller is a computer program running on the different mobile device.

23. The method as in claim 22 wherein the mobile device is a cellular phone.

24. The method as in claim 22 wherein the mobile device is a personal digital assistant.

25. The method as in claim 1 wherein:
the first device is a personal computer and the first instant messaging controller is a computer program running on the personal computer; and
the second device is a different personal computer and the second instant messaging controller is a computer program running on a different personal computer.

26. The method as in claim 1 wherein:
receiving the first request includes receiving the first request from the first instant messaging controller on the first device from a first IP address;
receiving the second request includes receiving the second request from the second instant messaging controller on the second device from a second IP address that differs from the first IP address; and
communicating the notification includes communicating the notification to at least the first instant messaging controller on the first device at the first IP address.

27. The method as in claim 1 further comprising:
receiving, from the first instant messaging controller on the first device, a reply to the notification; and
logging the instant messaging online identity off from the instant messaging system from the second instant messaging controller on the second device in response to the reply received from the first instant messaging controller on the first device.

28. The method as in claim 1 further comprising:
enabling the user to force the instant messaging online identity to be logged off from the instant messaging system at the second instant messaging controller on the second device from the first instant messaging controller on the first device in response to determining that the same instant messaging online identity is logged on to the instant messaging system from the first instant messaging controller on the first device while concurrently being logged on to the instant messaging system from the second instant messaging controller on the second device;
receiving, from the first instant messaging controller on the first device, a request from the user to force the instant messaging online identity to be logged off from the instant messaging system at the second instant messaging controller on the second device; and
in response to receiving the request from the first instant messaging controller on the first device to force the instant messaging online identity to be logged off from the instant messaging system at the second instant messaging controller on the second device, logging the instant messaging online identity off from the instant messaging system at the second instant messaging controller on the second device.

29. The method as in claim 1 wherein communicating the notification to at least one of the first instant messaging controller on the first device and the second instant messaging controller on the second device includes communicating the notification to at least the first instant messaging controller on the first device.

30. A system comprising:
a processor; and
a memory storage device storing instructions that, when executed by the processor, cause the processor to:
receive, from a first instant messaging controller on a first device, a first request for an instant messaging online identity assigned to a user to be logged on to an instant messaging system at a first instant messaging controller on a first device;
log the instant messaging online identity on to the instant messaging system at the first instant messaging controller on the first device in response to the first request;
while the instant messaging online identity remains logged on to the instant messaging system from the first instant messaging controller on the first device:
receive, from a second instant messaging controller on a second device, a second request for the same instant messaging online identity assigned to the same user to be logged on to the instant messaging system at a second instant messaging controller on a second device, wherein the second instant messaging controller differs from the first instant messaging controller and the second device differs from the first device;
log the instant messaging online identity on to the instant messaging system at the second instant messaging controller on the second device in response to the second request;
determine that the same instant messaging online identity is logged on to the instant messaging system from the first instant messaging controller on the first device while concurrently being logged on to the instant messaging system from the second instant messaging controller on the second device; and
communicate a notification to at least one of the first instant messaging controller on the first device and the second instant messaging controller on the second device indicating that the instant messaging online identity is logged on to the instant messaging system from the second instant messaging controller on the second device while concurrently being logged on to the instant messaging system from the first instant messaging controller on the first device in response to determining that the instant messaging online identity is logged on to the instant messaging system from the first instant messaging controller on the first device while concurrently being logged on to the instant messaging system from the second instant messaging controller on the second device.

31. A computer-implemented method comprising:
  receiving, from a first instant messaging controller on a first device, a first request for a first instant messaging online identity to be logged on to an instant messaging system at a first instant messaging controller on a first device;
  logging the first instant messaging online identity on to the instant messaging system at the first instant messaging controller on the first device in response to the first request;
  while the first instant messaging online identity remains logged on to the instant messaging system from the first instant messaging controller on the first device:
    receiving, from a second instant messaging controller on a second device, a second request for a second instant messaging online identity to be logged on to the instant messaging system at a second instant messaging controller on a second device;
    logging the instant messaging online identity on to the instant messaging system at the second instant messaging controller on the second device in response to the second request;
  determining that the first instant messaging online identity is the same instant messaging online identity as the second instant messaging online identity and that the same instant messaging online identity is logged on to the instant messaging system from the first instant messaging controller on the first device while concurrently being logged on to the instant messaging system from the second instant messaging controller on the second device; and
  communicating a notification to at least one of the first instant messaging controller on the first device and the second instant messaging controller on the second device indicating that the same instant messaging online identity is logged on to the instant messaging system from the second instant messaging controller on the second device while concurrently being logged on to the instant messaging system from the first instant messaging controller on the first device in response to determining that the same instant messaging online identity is logged on to the instant messaging system from the first instant messaging controller on the first device while concurrently being logged on to the instant messaging system from the second instant messaging controller on the second device.

32. The method as in claim 1 wherein the instant messaging online identity assigned to the user is an instant messaging screen name assigned to the user such that:
  receiving a first request for the instant messaging online identity assigned to the user to be logged on to the instant messaging system at the first instant messaging controller on the first device includes receiving a first request for the instant messaging screen name assigned to the user to be logged on to the instant messaging system at the first instant messaging controller on the first device;
  logging the instant messaging online identity on to the instant messaging system at the first instant messaging controller on the first device includes logging the instant messaging screen name on to the instant messaging system at the first instant messaging controller on the first device;
  receiving a second request for the same instant messaging online identity assigned to the same user to be logged on to the instant messaging system at the second instant messaging controller on the second device includes receiving a second request for the same instant messaging screen name assigned to the same user to be logged on to the instant messaging system at the second instant messaging controller on the second device while the instant messaging screen name remains logged on to the instant messaging system from the first instant messaging controller on the first device;
  logging the instant messaging online identity on to the instant messaging system at the second instant messaging controller on the second device includes logging the instant messaging screen name on to the instant messaging system at the second instant messaging controller on the second device while the instant messaging screen name remains logged on to the instant messaging system from the first instant messaging controller on the first device;
  determining that the same instant messaging online identity is logged on to the instant messaging system from the first instant messaging controller on the first device while concurrently being logged on to the instant messaging system from the second instant messaging controller on the second device includes determining that the same instant messaging screen name is logged on to the instant messaging system from the first instant messaging controller on the first device while concurrently being logged on to the instant messaging system from the second instant messaging controller on the second device; and
  communicating a notification to at least one of the first instant messaging controller on the first device and the second instant messaging controller on the second device indicating that the instant messaging online identity is logged on to the instant messaging system from the second instant messaging controller on the second device while concurrently being logged on to the instant messaging system from the first instant messaging controller on the first device includes communicating a notification to at least one of the first instant messaging controller on the first device and the second instant messaging controller on the second device indicating that the instant messaging screen name is logged on to the instant messaging system from the second instant messaging controller on the second device while concurrently being logged on to the instant messaging system from the first instant messaging controller on the first device.

33. The method as in claim 1 wherein the instant messaging online identity assigned to the user corresponds to an instant messaging account assigned to the user such that:
  receiving a first request for the instant messaging online identity assigned to the user to be logged on to the instant messaging system at the first instant messaging controller on the first device includes receiving a first request for the instant messaging online identity corresponding to the instant messaging account of the user to be logged on to the instant messaging system at the first instant messaging controller on the first device;
  logging the instant messaging online identity on to the instant messaging system at the first instant messaging controller on the first device includes logging the instant messaging online identity corresponding to the instant messaging account of the user on to the instant messaging system at the first instant messaging controller on the first device;
  receiving a second request for the same instant messaging online identity assigned to the same user to be logged on to the instant messaging system at the second instant messaging controller on the second device includes receiving a second request for the same instant messaging online identity corresponding to the same instant messaging account of the same user to be logged on to the instant messaging system at the second instant messaging controller on the second device while the instant messaging online identity corresponding to the instant messaging account of the user remains logged on to the instant messaging system from the first instant messaging controller on the first device;

logging the instant messaging online identity on to the instant messaging system at the second instant messaging controller on the second device includes logging the instant messaging online identity corresponding to the instant messaging account of the user on to the instant messaging system at the second instant messaging controller on the second device while the instant messaging identity corresponding to the instant messaging account of the user remains logged on to the instant messaging system from the first instant messaging controller on the first device;

determining that the same instant messaging online identity is logged on to the instant messaging system from the first instant messaging controller on the first device while concurrently being logged on to the instant messaging system from the second instant messaging controller on the second device includes determining that the same instant messaging online identity corresponding to the same instant messaging account of the user is logged on to the instant messaging system from the first instant messaging controller on the first device while concurrently being logged on to the instant messaging system from the second instant messaging controller on the second device; and communicating a notification to at least one of the first instant messaging controller on the first device and the second instant messaging controller on the second device indicating that the instant messaging online identity is logged on to the instant messaging system from the second instant messaging controller on the second device while concurrently being logged on to the instant messaging system from the first instant messaging controller on the first device includes communicating a notification to at least one of the first instant messaging controller on the first device and the second instant messaging controller on the second device indicating that the instant messaging online identity corresponding to the instant messaging account of the user is logged on to the instant messaging system from the second instant messaging controller on the second device while concurrently being logged on to the instant messaging system from the first instant messaging controller on the first device.

\* \* \* \* \*